US009819782B1

(12) United States Patent
Daniels

(10) Patent No.: US 9,819,782 B1
(45) Date of Patent: Nov. 14, 2017

(54) NEUROLOGICAL COMMUNICATION DEVICE

(71) Applicant: Shavar Daniels, Bronx, NY (US)

(72) Inventor: Shavar Daniels, Bronx, NY (US)

(73) Assignee: Shavar Daniels, Bronx, NY (US)

( * ) Notice: Subject to any disclaimer, the term of this patent is extended or adjusted under 35 U.S.C. 154(b) by 0 days.

(21) Appl. No.: 15/426,432

(22) Filed: Feb. 7, 2017

(51) Int. Cl.
| *A61B 5/0476* | (2006.01) |
| *H04M 1/725* | (2006.01) |
| *G06F 3/01* | (2006.01) |
| *G06F 3/16* | (2006.01) |

(52) U.S. Cl.
CPC ........ *H04M 1/72533* (2013.01); *G06F 3/015* (2013.01); *G06F 3/167* (2013.01)

(58) Field of Classification Search
None
See application file for complete search history.

(56) References Cited

U.S. PATENT DOCUMENTS

| 5,867,765 A * | 2/1999 | Nilsson | H04B 7/18541 455/13.1 |
| 6,489,934 B1 * | 12/2002 | Klausner | H04M 1/0272 345/1.1 |
| 7,855,812 B2 * | 12/2010 | Gelsomini | G06K 9/2009 235/451 |
| 8,786,246 B2 * | 7/2014 | Tsui | H02J 7/0055 320/101 |
| 2005/0254778 A1 * | 11/2005 | Pettersen | H04R 1/44 386/333 |
| 2008/0287074 A1 * | 11/2008 | Grunhold | H04M 1/6091 455/90.2 |
| 2012/0270598 A1 * | 10/2012 | Okuda | H04N 13/0239 455/556.1 |
| 2013/0204153 A1 * | 8/2013 | Buzhardt | A61B 5/0476 600/544 |
| 2015/0095028 A1 * | 4/2015 | Karpey | G10L 17/26 704/246 |
| 2016/0320840 A1 * | 11/2016 | Hwang | G06F 3/015 |
| 2017/0042439 A1 * | 2/2017 | Yeow | A61B 5/4839 |

* cited by examiner

*Primary Examiner* — Ping Hsieh
*Assistant Examiner* — James Yang

(57) ABSTRACT

An ear worn brainwave brain activity dual phone communication device that works independently for enabling human beings to communicate with their mind, move objects and machines by way of their monitored brain activity. The communication system is sufficiently independent to initiate and receive communication without requiring a mobile phone, since contact information is stored in the communication device. The communication system performs functions with an audible command or brainwave brain activity such as initiating communication, accessing content, moving and controlling other machines and computer devices, accessing tools.

2 Claims, 5 Drawing Sheets

NEUROLOGICAL COMMUNICATION DEVICE

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a neurological communication device. More particularly, certain embodiments of the invention relates to a neurological communication device that records brainwave activity and converts the corresponding electrical signals to radio wave signals, so as to generate command signals to move objects or operate communication apparatuses.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that Electroencephalography (EEG) is an electrophysiological monitoring method to record electrical activity of the brain. It is typically noninvasive, with the electrodes placed along the scalp, although invasive electrodes are sometimes used in specific applications. EEG measures voltage fluctuations resulting from ionic current within the neurons of the brain.

It is known that, telekinesis is the psychic ability to directly influence objects using the mind. Telekinesis may be used to move objects, vibrate objects, and also manipulate time, elements, space, and energy. Telekinesis can also be used to distort material items and has been cited as the power used to manipulate random number generators.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
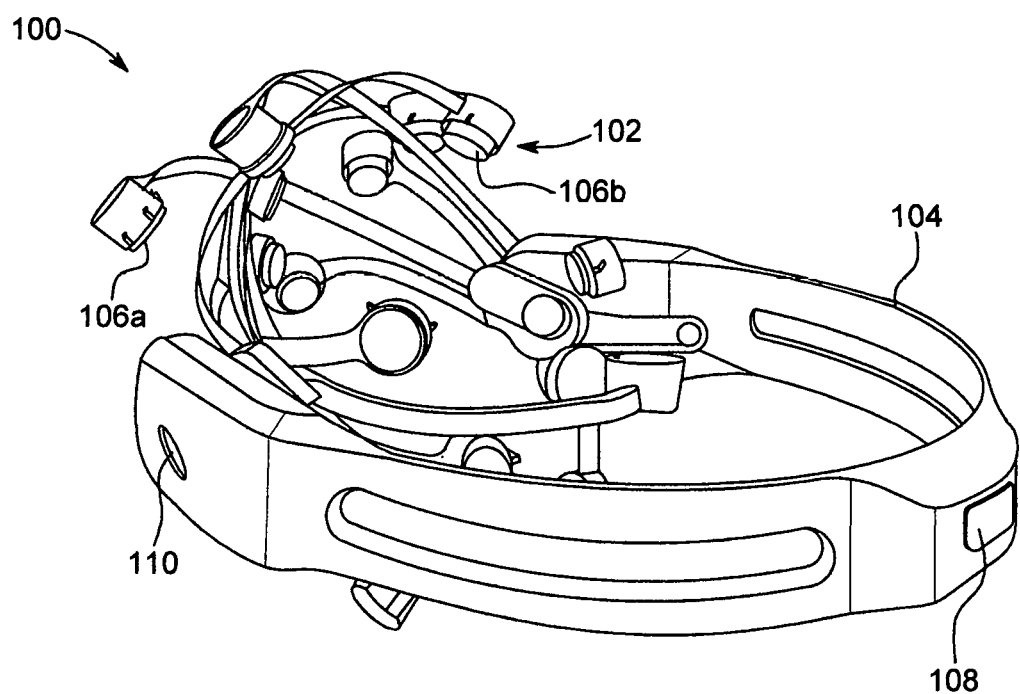
FIG. 1 illustrates a perspective view of an exemplary neurological communication device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter.", e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, *In re Hutchison*, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.).

Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The present invention will now be described in detail with reference to embodiments thereof as illustrated in the accompanying drawings.

There are various types of mind control and telekinesis devices that may be provided by preferred embodiments of the present invention.

FIG. 1 illustrates a perspective view of an exemplary neurological communication device 100. In one aspect, the neurological communication device may be configured to detect and process brainwave activity from a brain and connected neurons, and then convert the brainwave activity to radio wave signals that are deciphered by a brainwave activity algorithm. The algorithm translates the radio wave signals to command signals to enable physical displacement of an object, or operation of a processor or communication apparatus.

Both brainwave activity and audible commands may generate a command signal for moving objects or operating a communication apparatus. A sensing portion detects and records the brainwave activity, while a microphone records the audible commands. Thus, objects may be displaced and communication apparatuses may be operated hands free and with minimal effort. In one embodiment, the neurological communication device may be an ear worn brainwave and brain activity communication device.

In some embodiments, the neurological communication device may be configured to operate proximal to the brain so as to detect the optimal brainwave activity. Once detected and captured, the brainwave activity may then be converted to a radio wave signal with an antenna. The radio wave signal may be emitted to a control portion having a brainwave activity algorithm that translates the radio wave signal to a physical action that at least partially displaces an object or communicates an action.

In some embodiments, the communication device may provide at least one sensing portion 102. The sensing portion may be configured to sense, or detect, the brainwave activity. The sensing portion may detect brainwave activity from the brain, and specifically electrical signals corresponding to brainwave activity. In one embodiment, the sensing portion measures voltage fluctuations resulting from ionic current within the neurons of the brain.

In one embodiment, the sensing portion may include at least one electroencephalography (EEG) 106a, 106b. Through the EEG, input brainwave activity may be monitored and then sent to an antenna to be converted to radio wave signals. In another embodiment, the sensing portion may include a full EEG surface sensor array head cap that affixes to the head.

In some embodiments, the device may include an antenna 108 for converting the electrical signals from the brain to radio waves. The antenna is configured to detect the brainwave activity wirelessly and convert the brainwave activity to radio waves. After detection of brainwave activity, the antenna transmits the radio waves to a remote antenna, which transmit the radio waves to a satellite. The antenna may capture the electrical signals from the sensing portion and convert them to radio waves. Thus, the brainwave activity is captured, converted to electrical signals, and then converted to radio wave signals based on the detected brainwave activity.

In another embodiment, an audible command spoken into the microphone on the assembly may also be used to operate the ancillary components and also to control the displacing of objects and operation of communication apparatuses.

In some embodiments, the neurological communication device may include a control portion 110. The control portion may decipher the number and type of radio wave signals from the antenna, and then determine a correct output such as a function or feature to be manipulated.

In some embodiments, the control portion may be responsive to the radio wave signals. The control portion may direct a member to effect movement of the object. In some embodiments, the control portion comprises a brainwave activity algorithm. The algorithm may be a self-contained step-by-step set of operations performed for converting the radio waves generated by the antenna to a command signal that commands the physical activity or operation of the communication apparatus.

In one aspect, a mounting portion 104 enables detachable attachment of the sensing portion to the ear. Those skilled in the art will recognize that the ear is proximal to the brain. This proximal positioning of the neurological communication device to the brain enables the sensing portion to more clearly pickup brainwave activity.

Figure 2A:
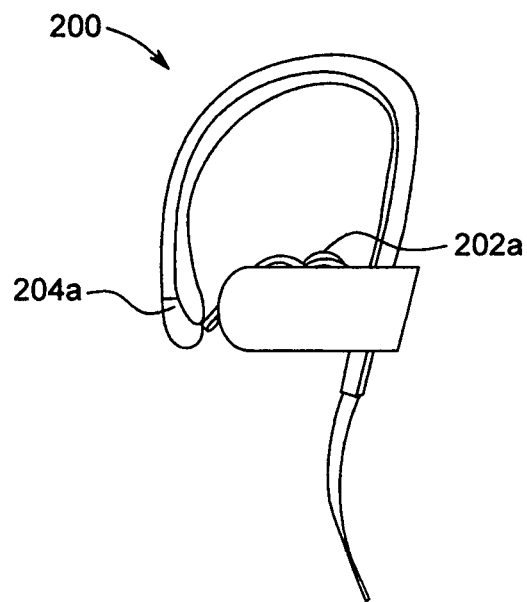
FIGS. 2A and 2B illustrate perspective views of exemplary recording portions and exemplary mounting portions for a neurological communication device, in accordance with an embodiment of the present invention.
Figure 2B:
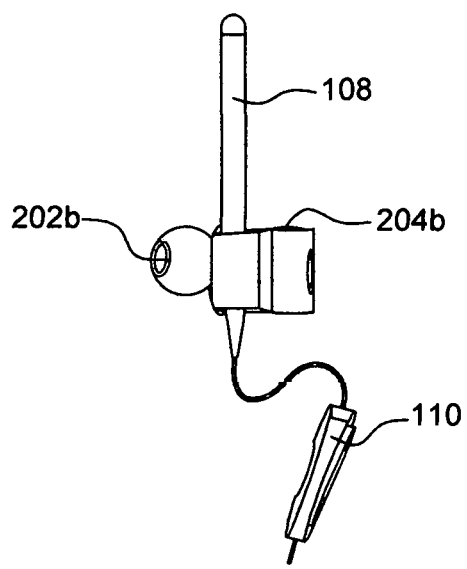

FIGS. 2A and 2B illustrate perspective views of exemplary recording portions and mounting portions for a neurological communication device.

Looking back at FIG. 1, the mounting portion enables detachable attachment of the sensing portion to the ear. Though in other embodiments, the sensing portion may be mounted anywhere on the head or neck. This proximal positioning to the brain enhances detection and recording of the brainwave activity. The mounting portion may include a hook, a head cap, a head band, and a wire.

A recording portion may also be used to capture the brainwave activity from the brain. In one embodiment, the recording portion may include an electrode placed along the scalp. In another embodiment, the recording portion may include invasive electrodes. The recording portion may also include a microphone to detect audio signals and convert to command signals accordingly. In another embodiment, the mounting portion may include, without limitation, two ear pieces, ear buds, large headphones, wearable headset around the neck, and a one ear worn speaker assembly.

The mounting portion positions the recording portion in the optimal position for brainwave activity and user comfort. As discussed above, the recorded brainwave activity may be transmitted to the antenna and sent as radio waves to a control portion to be converted into a physical command signal.

As illustrated in FIG. 2A, the mounting portion and the recording portion may form an integral ear communication assembly 200. An ear mounting member 204a may be configured to be operable to at least partially engage with an ear. The ear mounting member may include a hook shape configured to at least partially wrap around the ear. The ear mounting member may be operable to initiate a communication in response to an audible command or just by thinking. In some embodiments, a microphone 204b may be integrated into the ear mounting member. The microphone may be used to receive audible commands from a user. Both brainwave activity and audible commands may be used to generate a command signal for moving objects or operating a communication apparatus.

An ear communication apparatus 202a, 202b may be operable with the ear mounting member. The ear communication apparatus may be configured with a speak recognition function to be operable to perform at least one function with audible command or just by thinking. The ear communication apparatus may also exchange data with an external processor. The ear communication apparatus may also be used as a remote control that is operable to control at least some of the features or functions listed below.

Figure 3:
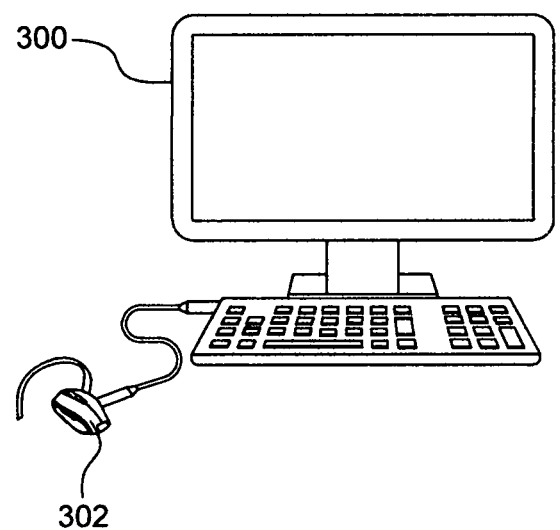
FIG. 3 illustrates a perspective view of an exemplary computer operable with a neurological communication device, in accordance with an embodiment of the present invention.

FIG. 3 illustrates a perspective view of an exemplary computer operable with a neurological communication device.

In one exemplary use of the neurological communication device, replacement and restoration of lost motor functions in paralyzed humans may be possible by routing movement-related signals from the brain, around damaged parts of the nervous system, to an external controller. In other exemplary uses, a processor 300 and a communication apparatus 302 may be operated from the brainwave activity. In yet another exemplary embodiment, commercial transactions may be performed through focusing brainwave activity to select an item and pay for an item.

Through the above discussed aspects, the neurological communication device may read brainwave activity and convert this to a physical activity or operation of a communication apparatus. Examples of such operation are discussed below.

In some embodiments, the neurological communication device may record brainwave activity and then save the brainwave activity in a remote data storage portion, such as a cloud. The cloud may serve as a transcript of one's life activities. The recorded brainwave activity may be printed out from a computer to for viewing or listening with the PDA system feature on the communication device.

In yet another aspect, the neurological communication device may be configured to recall files by name audibly or through brainwave activity. The brainwave activity is processed and recalled in alphabetical order and recognizes your voice and speaks to by a user's name, before answering by the name.

In yet another aspect, the neurological communication device may provide a communication processor configured to initiate communication in response to the audible command or just through brainwave activity.

In yet another aspect, the neurological communication device may provide a microphone that operatively joins with the processor. The microphone may be configured to receive audible command or brainwave activity. The microphone may comprise an array of microphones configured to determine the directionality of the audible command or brainwave activity. The array of microphones may be used to differentiate multiple audible commands or brainwave activity.

In yet another aspect, the neurological communication device may provide a speaker to transmit communications received form an external communication device. The speaker may include an adjustable volume configured to be operable with the audible command or the brainwave activity.

In yet another aspect, the neurological communication device may provide a task module. The task module receives the audible command or brainwave activity from the microphone to perform a voice activated operation.

In yet another aspect, the neurological communication device may provide a network module that is configured to receive a task operation from the task module. The network module may send the task operation to at least one of an external computer for execution. This may be performed with brainwave activity or audible commands.

In yet another aspect, the neurological communication device may provide a display configured to display the contacts from the database of contacts. The display comprises at least a touch screen configured to allow for initiating and receiving of communication from the contacts and to control communication device functions. The touch screen on the device may have numbers display and allows for tactile engagement to accept calls, change functions, turn the device off and on, and control the volume through brainwave activity or audible commands.

In yet another aspect, the neurological communication device may provide a dual global telecommunication network connection capability. The dual global telecommunication network enables a user to make international calls. In one embodiment, it is possible to have two numbers on the same device and one number that works across all devices. This feature may be accessed by brainwave activity or saying "phone" or stating the desired name to call.

In yet another aspect, the neurological communication device may provide a cell phone that works through brainwave activity or by audible command. In this embodiment, no additional phones are needed to operate. The cell phone may also work with other cell phones by Bluetooth when no phone service is activated In yet another aspect, the neurological communication device may provide a capability to remotely control other machines and computer devices. In yet another aspect, the neurological communication device may provide a memory of 8 GB-500 GB of storage capacity. In yet another aspect, the neurological communication device may provide a database of contacts;

In yet another aspect, the neurological communication device may provide a Bluetooth connection capability. The neurological communication device may sync with Bluetooth enabled devices. The feature may be accessed through brainwave activity or audible commands.

In yet another aspect, the neurological communication device may provide a digital book; a digital notepad; an audible word processor; and an electronic digital encyclopedia. The audible encyclopedia may operate by asking questions and automatically providing the answers. The audible encyclopedia may be accessed through brainwave activity or audible commands. The internet capability, may be accessed through the web in every spoken audible language or brainwave activity. The internet may be accessed through brainwave activity or audible commands.

In yet another aspect, the neurological communication device may provide a Global Positioning System (GPS). The multiple language audible GPS system may indicate a location of the user, and instructions for the mind to provide directions by plane, boat, train, bus, car, or foot. This feature may be accessed through brainwave activity or audible commands, such as by saying "GPS". Once accessed the GPS system may be used to reach the desired location.

In yet another aspect, the neurological communication device may provide an audible language changer feature for deciphering any spoken language. A user may speak one language and the neurological communication device returns the phrase as a different language. This feature may be accessed through brainwave activity or audible commands, such as speaking "language changer" into the microphone.

In yet another aspect, the neurological communication device may provide a personal digital assistant (PDA) system. The PDA that may perform phone calls, emails, texts, and shops online for you on a specified day and time. The PDA system may have the capability to do all of these features independently.

In yet another aspect, the neurological communication device may provide a WIFI calling connection capability. In another embodiment, the neurological communication device also makes WIFI calling and has WIFI internet connection capability. This feature may be accessed through brainwave activity or audible commands, or by speaking "Turn on WIFI calling or WIFI internet."

In yet another aspect, the neurological communication device may provide a WIFI internet connection capability. In yet another aspect, the neurological communication device may provide a mobile hotspot functionality. In this embodiment, multiple mobile hotspot capability may be used. This feature may be accessed through brainwave activity or audible commands, or by or by audible command saying hotspot connector.

In yet another aspect, the neurological communication device may provide a digital dictionary. Also, a digital clock is provided, which is a programmable control the clock through brainwave activity, audible command, or speaking the date and time when queried. This feature may be accessed through brainwave activity, audible commands, or by speaking "clock" or "PDA's name and ask for the time, weather etc.

In yet another aspect, the neurological communication device may provide a digital calculator configured to solve different types of math problems. This feature may be accessed through brainwave activity or audible commands, such as speaking "calculator" into the microphone.

In yet another aspect, the neurological communication device may provide calculator may be accessed through a 100' waterproof AM/FM/Satellite/Internet radio. A waterproof region may enable listening to music audibly underwater. The device is waterproof up until 100 feet. AM/FM radio, internet radio and satellite radio capabilities. This feature may be accessed through brainwave activity, audible commands, or stating the desired music feature.

In yet another aspect, the neurological communication device may provide a satellite radio configured to emit and receive short-wavelength radio transmissions and create a local network in proximity to the device.

In yet another aspect, the neurological communication device may provide a speech to text processor operable for transcribing spoken conversation for display to a screen of a communication device, such as an audible word processor. This feature may be accessed through brainwave activity or audible commands.

In yet another aspect, the neurological communication device may provide multiple language audible dictionary configured to describe any expression in words. The dictionary provides a word for the expression. The dictionary may also provide a definition to any word. This feature may be accessed through brainwave activity or audible commands, or speaking "dictionary".

In yet another aspect, the neurological communication device may provide a touch screen operable for control and operation of the device. The touch screen may include a tactile operated digital display, including manipulation of text and numbers, powering on and off, and edits.

In yet another aspect, the neurological communication device may provide a vibrator function for receiving calls. In yet another aspect, the neurological communication device may provide a voice ID banking system. The voice ID banking system may include a thinking and audible voice recognition banking ID system operatively connected to the microphone. This may be operable to enable a user to perform personal banking and wire money transfers. This feature may be accessed through brainwave activity or audible command.

In another embodiment, speaking a name to the voice identification system enables access to a desired bank. Once accessed the user may provide the bank with personal information, such as an email, telephone number, and social security number to access an account or receive services, e.g., wire transfers, from the bank.

In yet another aspect, the neurological communication device may provide a credit card bill payment system. In operation, a user may select a desired credit card by stating a name to the voice identification system, which in turn saves the credit card information on the device for online purchases.

In yet another aspect, the neurological communication device may provide a wireless point of sale payment system. In operation, a user may enter an establishment and is automatically connected to the establishment's wireless checkout system. Once connected, the stored credit card payment information is synced to the establishment's system. When checking out, the user may be alerted by a PDA voice feature to approve the purchase by the voice ID system. This feature may be accessed through brainwave activity or audible command.

In yet another aspect, the neurological communication device may provide a language translation module operatively to the microphone. The language translation module may be configured to be operable to translate textual communication to and from at least some languages. The language translation module is operable through brainwave activity or audible commands.

In yet another aspect, the neurological communication device may provide a car remote control module, which is configured to be operable for remotely controlling at least some operations of a car. The car remote control module may be operable for remotely controlling at least some operations of the car including, without limitation, unlock car doors, windows, trunks, turn car off and on, finding the car, parking the car, driving the car, and link up your music, internet to listen to it in the car. This feature may be accessed through brainwave activity or audible commands.

In yet another aspect, the neurological communication device may provide capability to download music with a USB cord, OTG flash drive or wirelessly by just thinking or audible commands, this feature may save downloaded music from an internet music streaming application and share it. This feature may be accessed through brainwave activity or audible commands.

In yet another aspect, the neurological communication device may provide an answering machine. The answering machine may be programmed to create preprogrammed messages to people, with the PDA. The answering machine may be accessed through brainwave activity or audible commands, such as speaking "answering machine", then stating a person's name to give a massage to when they call. Then the message is stated.

In yet another aspect, the neurological communication device may provide a motion sensor configured to be operable to detect proximal motion.

In yet another aspect, the neurological communication device may provide a computer or machine remote control module, which is configured to be operable for remotely controlling at least some operations of another computer, machine, and communication device. The computer remote control module may remotely control at least some operations of another computer or machine. This feature is actuated through brainwave activity or audible commands, such as speaking "computer remote" into a microphone. Once the computers are synced, the computers or machines by Bluetooth technology and WIFI technology may be accessed.

In yet another aspect, the neurological communication device may provide a voice recognition module operatively connected to the microphone, which is configured to be operable to turn said ear worn brain wave phone communication device off and on; voice recognition module, which is configured to be operable to turn said communication device off and on. You state your name into the devices voice ID system, once cleared you can turn the devices off and on In yet another aspect, the neurological communication device may provide a vital signs measurement module, which is operatively connected with measurement sensors and signal processing algorithms operable to monitor at least one of a heart rate, pulse and body temperature; capability to check your pulse, heart rate, and body temperature and gives the results audibly or to your brain. The devices ear piece has the capability to do this feature. This feature may be accessed through brainwave activity or audible commands.

In yet another aspect, the neurological communication device may provide a 100' 3D waterproof camera. The 3D waterproof camera is waterproof up until 100'. This feature may be accessed through brainwave activity or audible commands, such as speaking the term "camera".

In yet another aspect, the neurological communication device may provide a projector, which is configured to be operable for projecting the display content of the communication apparatus onto a nearby wall. The projector may be configured to project pictures, videos, internet, movies, TV, text, emails, facetime, on any wall. The projector, is configured to be operable for projecting the display content of said communication device onto nearby wall. This feature may be accessed through brainwave activity or audible commands, such as by speaking the term "projector" into the microphone portion. In some embodiments, the user stands at least three feet in front of any wall and the images are displayed on the wall in color, and then brainwave activity or audible commands project the image or video.

In yet another aspect, the neurological communication device may provide a video camera and camera that is operable with brainwave activity or audible commands. The user may send images and videos to people through internet sites, facetime, email, text, social media sites, and the cloud. An audio or written message or video may also be added and enjoyed. In some embodiments, the camera is also waterproof to take underwater footage. This feature may be accessed through brainwave activity or audible commands.

In yet another aspect, the neurological communication device may provide a scanner. The scanner may be configured to scan bar codes and indicate the name and price of consumer items to pay for them. This feature may be accessed through brainwave activity or audible commands, such as by speaking the term "scanner" into the microphone portion.

In yet another aspect, the neurological communication device may provide a downloadable operating system capability. In this embodiment, the operating system may be downloaded to the device wirelessly from the cloud or internet through brainwave activity or an audible command, such as saying personal information, like an email address and name.

In yet another aspect, the neurological communication device may provide a data port configured to receive a data cord for exchanging data with a remote data storage or an external processor. The data port may include at least a fiber optic data port and the data cord comprising at least fiber optic cable. The data port may be positioned on the mounting portion.

In some embodiments, the neurological communication device may include USB port/flash drive capability may also be provided to transfer information to other devices or to just save on a flash drive. This may be performed through brainwave activity or audible commands. The USB cable may be operatively connected with an OTG flash drive, or wirelessly to transfer the information back and forth between the devices.

In yet another aspect, the neurological communication device may provide a brain wave communication recording capability. In this manner, recorded notes are formed. The recorded nots may be transferred the notes with a USB cord, OTG flash drive or wirelessly to a printer to print out or to a cloud, TV, computer, cell phone to save and edit. This feature may be available through brainwave activity or audible commands.

In yet another aspect, the neurological communication device may be compatible with a car stereo, home stereo, and TV. Both the brainwave activity and the audible commands may control these communication apparatuses. This feature may be accessed by providing an audible command of "sync" to the specific device.

In yet another aspect, the neurological communication device may provide a power port configured to receive a power cord for connecting to an external power source. The neurological communication device may also provide a data port configured to receive a data cord for exchanging data with the external processor. The data port comprises at least a fiber optic data port. The data cord may include at least a fiber optic cable.

In one embodiment, the neurological communication device may provide a power source. The solar powered battery is configured to hold a charge, and may also be charged by a user's body heat. The power source may include, without limitation, a Lithium ion battery, Lithium polymer battery, and a solar powered battery that holds a charge and has the capability to be charged by a person's body heat.

In yet another aspect, the neurological communication device may provide a continuum capability to wirelessly or with a USB cable transmit data to other computers, compatible TV's through WI-FI and Bluetooth technology. You can also connect to computer monitors, keyboards, mouses and Game system consoles through WI-FI and Bluetooth connectivity.

In yet another aspect, the neurological communication device may provide wireless charging capability. It also can be charged with a wireless charging dock.

Figure 4:
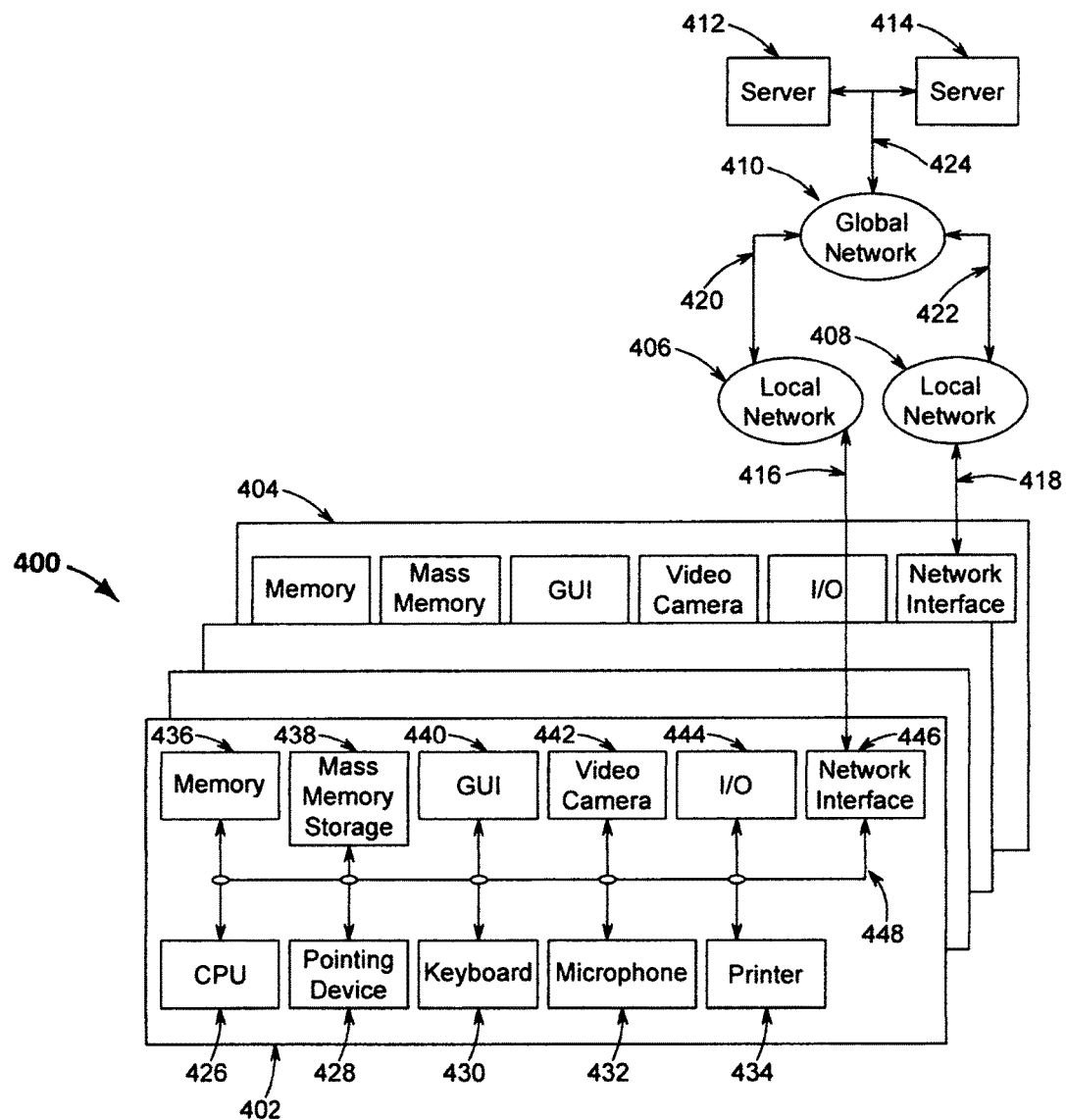
FIG. 4 is a block diagram depicting an exemplary client/server system which may be used by an exemplary web-enabled/networked embodiment of the present invention.

FIG. 4 is a block diagram depicting an exemplary client/server system which may be used by an exemplary web-enabled/networked embodiment of the present invention.

A communication system 400 includes a multiplicity of clients with a sampling of clients denoted as a client 402 and a client 404, a multiplicity of local networks with a sampling of networks denoted as a local network 406 and a local network 408, a global network 410 and a multiplicity of servers with a sampling of servers denoted as a server 412 and a server 414.

Client 402 may communicate bi-directionally with local network 406 via a communication channel 416. Client 404 may communicate bi-directionally with local network 408 via a communication channel 418. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

Clients 402 and 404 may take many different forms. Non-limiting examples of clients 402 and 404 include personal computers, personal digital assistants (PDAs), cellular phones and smartphones.

Client 402 includes a CPU 426, a pointing device 428, a keyboard 430, a microphone 432, a printer 434, a memory 436, a mass memory storage 438, a GUI 440, a video camera 442, an input/output interface 444, and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data and the like and is typically a secondary storage medium such as a hard disk. It will be appreciated that the information retained within mass memory storage 438, may, in appropriate cases, be incorporated in standard fashion as part of memory 436 as virtual memory.

CPU 426 may be coupled to GUI 440. GUI 440 enables a user to view the operation of computer operating system and software. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

Figure 5:
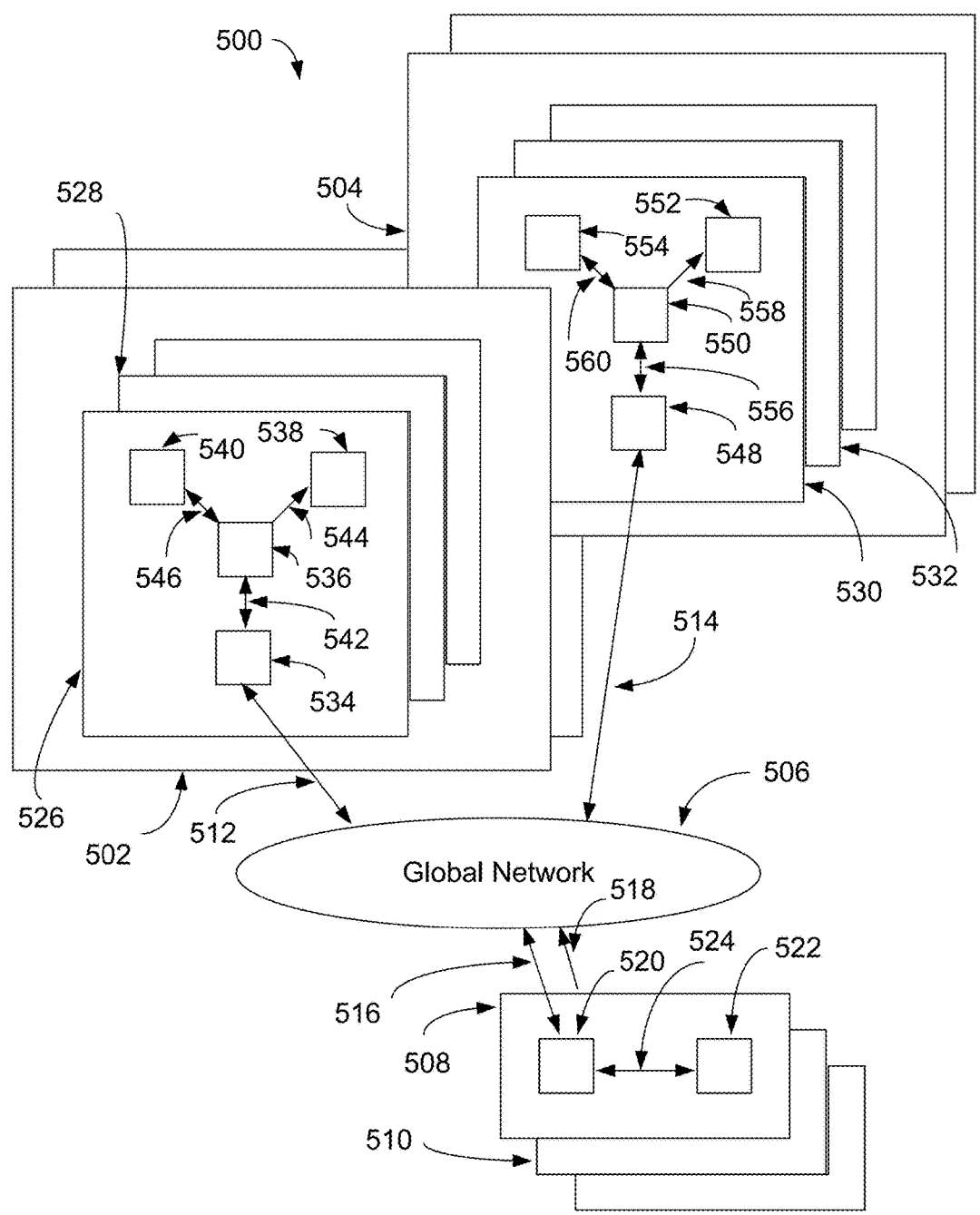
FIG. 5 illustrates a block diagram depicting a conventional client/server communication system.

FIG. 5 illustrates a block diagram depicting a conventional client/server communication system.

A communication system 500 includes a multiplicity of networked regions with a sampling of regions denoted as a network region 502 and a network region 504, a global network 506 and a multiplicity of servers with a sampling of servers denoted as a server device 508 and a server device 510.

Network region 502 and network region 504 may operate to represent a network contained within a geographical area or region. Non-limiting examples of representations for the geographical areas for the networked regions may include postal zip codes, telephone area codes, states, counties, cities and countries. Elements within network region 502 and 504 may operate to communicate with external elements within other networked regions or within elements contained within the same network region.

In some implementations, global network 506 may operate as the Internet. It will be understood by those skilled in the art that communication system 500 may take many different forms. Non-limiting examples of forms for communication system 500 include local area networks (LANs), wide area networks (WANs), wired telephone networks, cellular telephone networks or any other network supporting data communication between respective entities via hard-wired or wireless communication networks. Global network 506 may operate to transfer information between the various networked elements.

Server device 508 and server device 510 may operate to execute software instructions, store information, support database operations and communicate with other networked elements. Non-limiting examples of software and scripting languages which may be executed on server device 508 and server device 510 include C, C++, C# and Java.

Network region 502 may operate to communicate bi-directionally with global network 506 via a communication channel 512. Network region 504 may operate to communicate bi-directionally with global network 506 via a communication channel 514. Server device 508 may operate to communicate bi-directionally with global network 506 via a communication channel 516. Server device 510 may operate to communicate bi-directionally with global network 506 via a communication channel 518. Network region 502 and 504, global network 506 and server devices 508 and 510 may operate to communicate with each other and with every other networked device located within communication system 500.

Server device 508 includes a networking device 520 and a server 522. Networking device 520 may operate to communicate bi-directionally with global network 506 via communication channel 516 and with server 522 via a communication channel 524. Server 522 may operate to execute software instructions and store information.

Network region 502 includes a multiplicity of clients with a sampling denoted as a client 526 and a client 528. Client 526 includes a networking device 534, a processor 536, a GUI 538 and an interface device 540. Non-limiting examples of devices for GUI 538 include monitors, televisions, cellular telephones, smartphones and PDAs (Personal Digital Assistants). Non-limiting examples of interface device 540 include pointing device, mouse, trackball, scanner and printer. Networking device 534 may communicate bi-directionally with global network 506 via communication channel 512 and with processor 536 via a communication channel 542. GUI 538 may receive information from processor 536 via a communication channel 544 for presentation to a user for viewing. Interface device 540 may operate to send control information to processor 536 and to receive information from processor 536 via a communication channel 546. Network region 504 includes a multiplicity of clients with a sampling denoted as a client 530 and a client 532. Client 530 includes a networking device 548, a processor 550, a GUI 552 and an interface device 554. Non-limiting examples of devices for GUI 538 include monitors, televisions, cellular telephones, smartphones and PDAs (Personal Digital Assistants). Non-limiting examples of interface device 540 include pointing devices, mousse, trackballs, scanners and printers. Networking device 548 may communicate bi-directionally with global network 506 via communication channel 514 and with processor 550 via a communication channel 556. GUI 552 may receive information from processor 550 via a communication channel 558 for presentation to a user for viewing. Interface device 554 may operate to send control information to processor 550 and to receive information from processor 550 via a communication channel 560.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation:

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a neurological communication device may be configured to detect and process brainwave activity from a brain and connected neurons, and then convert the brainwave activity to radio wave signals that are deciphered by a brainwave activity algorithm to enable physical displacement of an object or operation of a processor or communication apparatus according to the present invention will be apparent to those skilled in the art. Various aspects of the invention have been described above by way of illustration, and the specific embodiments disclosed are not intended to limit the invention to the particular forms disclosed. The particular implementation of the neurological communication device may be configured to detect and process brainwave activity from a brain and connected neurons, and then convert the brainwave activity to radio wave signals that are deciphered by a brainwave activity algorithm to enable physical displacement of an object or operation of a processor or communication apparatus may vary depending upon the particular context or application. By way of example, and not limitation, the a neurological communication device may be configured to detect and process brainwave activity from a brain and connected neurons, and then convert the brainwave activity to radio wave signals that are deciphered by a brainwave activity algorithm to enable physical displacement of an object or operation of a processor or communication apparatus described in the foregoing were principally directed to an ear worn EEG that reads electrical signals from brain activity and converts to command signals to move objects or operate communication apparatuses, implementations; however, similar techniques may instead be applied to voice and thought combinations for remote control devices, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
   An ear worn brainwave brain activity dual communication phone device that works independently and detects brainwaves signals from a brain with sensors and wirelessly; converts the detected brainwave signals into electrical signals, then into radio waves, then transmits the radio waves to antennas, then transmits the radio waves to satellites; wherein the satellites converts the detected radio waves into another radio waves; to other antennas of other ear worn brainwave brain activity dual communication phone devices; wherein the other ear worn brainwave brain activity dual communication phone devices detect the radio waves; convert the other radio waves into another electrical signals, then into another brainwaves signals; then transmits the other brainwave signals to a communication apparatus comprising:
      an ear mounting member being configured to be operable to at least partially engage with an ear, wherein an ear mounting member comprises a hook shape configured to at least partially wrap around the ear, an ear worn brainwave brain activity dual communication phone device being configured to be operable to initiate a communication in response to an audible command or brainwave activity, an ear worn brainwave brain activity dual communication phone device being further configured with speak recognition function to be operable to perform at least one function with an audible command or brainwave brain activity, an ear worn brainwave brain activity dual communication phone device being further configured to exchange data with an external processor, an ear worn brainwave brain activity dual communication phone device further being configured as a remote control that is operable to control at least some features or functions listed below, an ear worn brainwave brain activity dual communication phone device being further configured to comprise:
      a communication processor configured to initiate a communication in response to an audible command or brainwave activity;
      a microphone operatively connected with a communication processor, a microphone is configured to receive an audible command or brainwave activity;
      a task module, a task module receives an audible command or brainwave activity from a microphone to perform a voice activated operation;
      a network module, a network module is configured to receive a task operation from a task module, wherein a network is further configured to send a task operation to at least one of an external computer for execution;
      Wherein a microphone comprises an array of microphones that is configured to determine directionality of an audible command or brainwave activity, and wherein an array of microphones is further configured to differentiate multiple audible commands or brainwave activity by position;
      a speaker configured to transmit communication received from an external communication device, wherein a speaker comprising an adjustable volume configured to be operable with an audible command or brainwave activity;
      a power port configured to receive a power cord for connecting to an external power source;
      a data port configured to receive a data cord for exchanging data with an external processor, a data port comprising at least a fiber optic data port and a data cord comprising at least fiber optic cable;
      a USB port/flash drive capability to transfer information to other devices or to just save on a flash drive;
      Connect a USB cable, an OTG flash drive, or wirelessly to transfer information back and forth from a device;
      a display configured to display a contact from a database of contacts, a display comprising at least a touch screen configured to allow for initiating and receiving of communication from a contact and to control communication device functions;
      a dual Global telecommunication network connection capability;
      a capability to remotely control other machines and computer devices;
      a memory of 32 GB-500 GB of storage capacity;
      a database of contacts;
      a short range wireless communication connection capability;
      a digital book;
      a digital notepad;
      an audible word processor;
      an electronic digital encyclopedia;
      an internet connection capability;
      a personal digital assistant (PDA) system;
      a WLAN calling connection capability;
      a WLAN internet connection capability;
      a mobile hotspot functionality;
      a digital dictionary;
      a digital clock;
      a Global Positioning System (GPS);
      a digital calculator;
      an AM/FM/Satellite/Internet radio;
      a satellite radio configured to emit and receive short-wavelength radio transmissions and create a local network in proximity to an ear worn brainwave phone communication device;
      a speech to text processor operable for transcribing spoken conversation for display to a screen of a communication device;
      a touch screen operable for controlling an ear worn brainwave phone communication device;

a vibrator function for receiving calls;
a credit card bill payment system;
a wireless point of sale payment system;
a language translation module operatively to a microphone, wherein a language translation module is configured to be operable to translate textual communication to and from at least some languages;
an answering machine;
a motion sensor configured to be operable to detect motion near an ear worn brainwave phone communication device;
a computer or machine remote control module, which is configured to be operable for remotely controlling at least some operations of another computer, machine, and communication device;
a voice recognition module operatively connected to a microphone, which is configured to be operable to turn an ear worn brainwave phone communication device off and on;
a vital signs measurement module, which is operatively connected with measurement sensors and signal processing algorithms operable to monitor at least one of a heart rate, pulse and body temperature;
a Li Ion, Li polymer battery;
a downloadable operating system capability;
a communication device that is configured multiple ways;
a continuum connection capability;
a brainwave communication recording capability;
a wireless charging capability.

2. A system consisting essentially of:
an ear worn brainwave brain activity dual communication phone device that works independently, an ear worn brainwave brain activity dual communication phone device that works independently comprising an ear piece, an ear piece being configured to be operable to at least partially engage with an ear, wherein an ear piece comprises a hook shape configured to at least partially wrap around the ear, an ear worn brainwave brain activity dual communication phone device that works independently being configured to be operable to initiate a communication in response to brainwave activity or audible command, an ear worn brainwave brain activity dual communication phone device that works independently being further configured with speak recognition function to be operable to perform at least one function with brainwave activity or audible command, an ear worn brainwave brain activity dual communication phone device that works independently being further configured to exchange data with an external processor, an ear worn brainwave brain activity dual communication phone device that works independently further being configured as a remote control that is operable to control at least some features or functions listed below, an ear worn brainwave brain activity dual communication phone device that works independently being further configured to comprise:
a communication processor configured to initiate a communication in response to an audible command or brainwave activity;
a microphone operatively connected with a communication processor, a microphone is configured to receive an audible command or brainwave activity;
a task module, a task module receives an audible command or brainwave activity from a microphone to perform a voice activated operation;
a network module, a network module is configured to receive a task operation from a task module, wherein a network module is further configured to send a task operation to at least one of an external computer for execution;
Wherein a microphone comprises an array of microphones that is configured to determine directionality of an audible command or brainwave activity, wherein an array of microphones is further configured to differentiate multiple audible commands or brainwave activity by position;
a speaker configured to transmit communication received from an external communication device, wherein a speaker comprises an adjustable volume configured to be operable with an audible command or brainwave activity;
a power port configured to receive a power cord for connecting to an external power source;
a data port configured to receive a data cord for exchanging data with an external processor, a data port comprising at least a fiber optic data port and a data cord comprising at least fiber optic cable;
a display configured to display a contact from a database of contacts, a display comprising at least a touch screen configured to allow for initiating and receiving of communication from a contact and to control communication device functions;
a dual Global telecommunication network connection capability;
a capability to remotely control other machines and computer devices;
a memory of 32 GB-500 GB of storage capacity;
a database of contacts; a short range wireless communication connection capability;
a digital book;
a digital notepad;
an audible word processor; an electronic digital encyclopedia;
an internet connection capability;
a personal digital assistant (PDA) system;
a WLAN calling connection capability;
a MAN internet connection capability;
a mobile hotspot functionality;
a digital dictionary;
a digital clock;
a Global positioning system (GPS);
a digital calculator;
an AM/FM/Satellite/internet radio;
a satellite radio configured to emit and receive short-wavelength radio transmissions and a local network in proximity to an ear worn brainwave phone communication device;
a speech to text processor operable for transcribing spoken conversation for display to a screen of a communication device;
a touch screen operable for controlling an ear worn brainwave phone communication device;
a vibrator function for receiving calls;
a credit card bill payment system;
a wireless point of sale payment system;
a language translation module operatively to a microphone, wherein a language translation module is configured to be operable to translate textual communication to and from at least some languages;
an answering machine;
a motion sensor configured to be operable to detect motion near an ear worn brainwave phone communication device;

a computer or machine remote control module, which is configured to be operable for remotely controlling at least some operations of another computer, machine, and communication device;

a voice recognition module operatively connected to a microphone, which is configured to be operable to turn an ear worn brainwave phone communication device off and on;

a vital signs measurement module, which is operatively connected with measurement sensors and signal processing algorithms operable to monitor at least one of a heart rate, pulse and body temperature;

a Li Ion, Li polymer battery;

a downloadable operating system;

a communication device that is configured multiple ways;

a continuum connection capability;

a brainwave communication recording capability;

a wireless charging capability.

* * * * *